United States Patent Office 2,885,292
Patented May 5, 1959

2,885,292

EMULSIFIED SALAD DRESSINGS

Robert J. Stapf, Chicago, Ill., assignor to Kraft Foods Company, Chicago, Ill., a corporation of Delaware No Drawing. Application June 28, 1956
Serial No. 594,347

7 Claims. (Cl. 99—144)

The present invention relates to improved salad dressings and more particularly, to salad dressings having improved flavor stability.

Salad dressing, which as used herein includes mayonnaise, has been prepared for many years in the home and, in general, comprises a mixture of edible oil and vinegar, the oil and vinegar being present in varying amounts. Spices, salt, sugar and other ingredients may be added to the dressing to obtain a desired product. The resulting salad dressing may comprise two phases which separate out on standing, that is, an aqueous phase and an oil phase. On the other hand, the salad dressing may be prepared on a single phase established by emulsifying the oil and acid ingredients to provide a homogeneous product. For purposes of this application, the single phase salad dressing will be referred to as "emulsified salad dressing."

By way of example, French emulsified salad dressing comprises about 25 to 50 percent vinegar, and a vegetable oil in an amount up to about 50 percent of the dressing. In order to stabilize the oil and acid ingredients, an emulsifying agent is employed which may be gum Acacia, Carobbean gum, gum Traganth or gum Karaya. The emulsifying agent is present only in small amounts, usually from about 0.25 to about 0.75 percent. The French emulsified salad dressing also includes small amounts of salt and sugar and, in addition, may comprise mustard, garlic, paprika and other spices.

The oil may comprise any one or a mixture of two or more edible oils, such as cotton seed oil and soya oil.

Another emulsified salad dressing within the scope of this invention is mayonnaise. In the preparation of the mayonnaise, eggs and an edible oil, such as soya oil and cotton seed oil are mixed together. To the mix are then successively added vinegar and spices, and the blend is emulsified.

Another product within the scope of this invention is an emulsified salad dressing comprising mayonnaise and a starch paste, which ingredients are blended together to provide a single phase product.

In these emulsified salad dressings, difficulty has been experienced in the preservation of the dressing, particularly during long storage at warm or relatively high ambient temperatures, e.g., such as are encountered in Central America. Under such conditions, deterioration of flavor occurs and off-flavors develop. Furthermore, in the case of French emulsified salad dressing, an undesired ring formation occurs near the top of the dressing upon storage. Of course, such changes are desirably avoided, and it is advantageous to stabilize the salad dressings, particularly under warm temperature conditions and during extended storage.

Accordingly, it is an object of this invention to provide emulsified salad dressing of improved flavor and stability. It is also an object of this invention to provide an emulsified salad dressing which has improved storage characteristics, particularly at relatively high ambient temperatures. Further objects of the present invention will be apparent from the following description of the invention.

It has been discovered that if chelating agents and/or sequestering agents are added to emulsified salad dressing, the development of off flavor in the salad dressing is substantially reduced, and improved storage stability results so that the salad dressing can be held at higher temperatures for longer periods. This is of particular advantage in the southern part of the United States and in Central America.

Chelating agents or sequestering agents are those which ordinarily sequester, tie-up or otherwise bind or render unavailable metal, such as copper and iron. The flavor at any particular time in the storage life of emulsified salad dressing has been found to be significantly improved by the use of chelating agents or sequestering agents over that of comparable dressings not containing such agents. In the case of French emulsified salad dressing, the use of these agents substantially prevents the ring formation.

The chelating or sequestering agents are those agents which effect a chelate type of chemical union, that is, a chemical union in which a central atom, usually a metal, is joined to others in the same molecule by both ordinary and coordinate valence forces. It has been found that of the chelating agents, those which are relatively water soluble and which bind or tie-up copper atoms are most valuable for the purposes of this invention. In this connection, it is preferred to use Sequestrene NA2. Sequestrene NA2 is the trade name of a disodium salt of ethylene diamine tetraacetic acid. It is more soluble in water than ethylene diamine tetraacetic acid. Accordingly, it is the chelating agent of choice.

Other suitable chelating agents are the trisodium and tetrasodium salts of ethylene diamine tetraacetic acid and ethylene diamine tetraacetic acid. Less suitable but also somewhat effective are such chelating agents as propyl gallate and hydroquinone.

The chelating or sequestering agent, for example Sequestrene NA2, has been found to be effective in relatively minute proportions in emulsified salad dressing. Thus, the chelating agent may be utilized in an amount from about 0.001 percent.

When Sequestrene AA is utilized in the emulsified salad dressing, its concentration is at least about 0.003 percent.

In general, it has been found that the amount of chelating agent to be added to the emulsified salad dressing should be sufficient to complex or tie-up any copper in the dressing. It is not uncommon for emulsified salad dressing to contain 0.2 to 3.0 parts per million of copper. However, when the copper level is higher or lower than the above described range, then the concentration of chelating agent should be commensurately increased or decreased. The level of addition can be readily determined when the amount of copper is known and the activity of the chelating agent is known.

The disodium salt of ethylene diamine tetraacetic acid, because of its relatively high water solubility, may be added at any point in the usual processing procedure for the preparation of emulsified salad dressing. Preferably, however, the compound is incorporated in the salad dressing by addition to the dry spice mix. The spice mix is then added at the appropriate stage of processing.

Ethylene diamine tetraacetic acid may also be added to the salad oil formulation at any desired stage. However, it should be added to the spice mix before the mix is incorporated in the dressing. When this compound is added to the dry spice mix, care must be taken in order to ensure its uniform distribution therein, particularly when only a portion of the spice mix containing the chelating agent is utilized in any one batch of salad dressing prepared. Careful blending of the compound with the other ingredients of the salad dressing should be practiced to assure its complete solution in the aqueous phase of the salad dressing. The relatively high solubility of the disodium salt obviates the necessity of taking special precautions to assure complete dispersion in the spice mix.

When the chelating agent has been added in an effective amount to the salad dressing during an appropriate stage in processing, the salad dressing is protected against deterioration, particularly when stored for long periods of time and at relatively high ambient temperatures.

The following examples more particularly set forth the present invention.

*Example I*

A French emulsified salad dressing was prepared by a standard process in accordance with the following formulation:

| Ingredients: | Amounts |
|---|---|
| Soy bean oil | 25 percent. |
| Cotton seed oil | 25 percent. |
| Vinegar | Balance with spice mix. |
| Spice mix (mustard, garlic, paprika, salt and sugar) | Balance with vinegar. |
| Emulsifying agent | 0.50 percent. |

The above dressing contained about 2 parts copper per million parts of dressing. The spice mix had blended therewith, prior to addition to the dressing, approximately 0.005 percent of disodium ethylene diamine tetraacetic acid.

The French dressing was placed in a glass jar which was then capped and stored at 98° F. for a period of 2 months. When tested, the dressing was found to have substantially improved flavor and storage stability in comparison with control samples of identical formulation but without the chelating agent. In addition, the vegetable oil in the dressing had not undergone any appreciable deterioration, that is, no rancidity was detected. Further, there was little development of the musty mustard type of flavor commonly found in usual dressings after prolonged aging, which flavor, however, was present in the control samples.

Subsequent samples at various concentrations of the chelating agent demonstrated that a level of 0.003 percent is also effective when about 2 parts per million of copper are present in the dressing.

The control sample developed a white ring near the top of the bottle, which ring was not present in the samples containing the chelating agent.

*Example II*

A mayonnaise was prepared according to the following formulation:

| Ingredients: | Amounts, pounds |
|---|---|
| Oil | 80 |
| Egg yolks | 7 |
| Vinegar | 9.4 |
| Sugar | .6 |
| Salt | .4 |
| Spices | 2.59 |

Disodium ethylene diamine tetraacetic acid in the amount of about 0.005 percent was blended with the spice mix before the latter was added to the formulation. The mayonnaise had a copper level of 2 parts per million.

The mayonnaise was placed in a glass jar which was then capped and stored at 72° F. for a period of 8 months. The above formulation was compared with an identical formulation stored for the same period of time under the same conditions, but which formulation contained a preservative agent in a concentration of about 0.01 percent, instead of the chelating agent. The preservative was a commercially available oil antioxidant which comprises a mixture in corn oil of 7 parts butylated hydroxy anisol, 20 parts butylated hydroxy toluene, 5 parts propyl gallate and 5 parts citric acid. This preservative has been heretofore used successfully in protecting oils, shortenings and some food products against deterioration.

A control mayonnaise was also prepared which comprised the same formulation but did not contain any chelating agent or preservative.

Each of the samples was stored at 72° F. for 8 months and then evaluated. The first sample, containing the unprotected mayonnaise was deteriorated. The desired flavor had not fully developed and, in addition, a distinct off-oil flavor was detected, as well as eggy and musty mustard flavors. Furthermore, a substantial amount of the initial spice flavor had been lost during storage, so that the dressing was somewhat flat in taste.

The second sample, containing the chelating agent, had a fully developed flavor and was of over-all excellent quality. The initial spice flavor had been substantially completely retained during storage. No off-oil flavor, eggy or musty mustard type flavor was detected. Further, the sample had a homogeneous appearance and exhibited no appreciable color change.

The third sample contained the preservative in a concentration twice that of the chelating agent in the second sample. The overall quality of the sample was substantially below that of the sample containing the chelating agent, but above that of the control sample. The dressing of sample three had an off-oil flavor. In addition, some eggy and musty mustard flavors were detected. Further, the natural aged flavor of the dressing was not as fully developed as in sample two.

The above results demonstrate the unusual effectiveness of chelating agents in emulsified salad dressing formulations subjected to long storage at relatively high temperatures.

A subsequent test identical with that of Example II was performed. Again, a noticeable improvement in flavor and stability in the sample containing chelating agent was found, when compared with the preservative-containing sample and the control sample.

Other copper complexing agents also are effective and, as indicated, propyl gallate and hydroquinone provide good results. It is believed that the presence of even relatively small amounts, of the order of about 0.2 part per million and above, of copper in a normal salad dressing formulation contributes materially to the deterioration of the formulation, particularly on storage at relatively high temperatures. By the use of the sequestering or chelating agents as specified for this invention, the copper is apparently made unavailable or is blocked from promoting the deterioration of the salad dressing. In any event, undesirable flavors do not develop in the dressings when the chelating agents are added. Moreover, the action of the sequestering or chelating agent is such that the flavor changes normally occurring upon aging of salad dressings are allowed to proceed and, in fact, appear to be enhanced so that the full flavor characteristics are developed in the dressings. Spices added to the salad dressings are preserved in full strength.

Of course, the chelating agent may be a single additive or mixture of two or more chelating agents. Other materials may be added to the emulsified salad dressings to provide their own particular beneficial properties, such as coupling agents, various flavoring agents, coloring compounds, etc. Such addition, however, should not interfere with the advantageous effects produced by the sequestering or chelating agent, nor should it deleteriously affect the salad dressing itself.

It is to be understood that this invention is not limited to the use of the particular chelating or sequestering agents above specified, but extends to all chelating or sequestering agents (a) which are non-deleterious to salad dressings, (b) which are capable of binding up or otherwise rendering unavailable copper occurring in salad dressings and (c) which are sufficiently water- or oil-soluble to allow adequate dispersion in the usual salad dressing formulations or which may be suitably incorporated in such formulations through the use of coupling agents and the like.

Modifications in the improved emulsified salad dressings of this invention and the methods of making the same as are within the scope of one versed in the art are contemplated as part of this invention.

Various features of the present invention which are believed to be new are set forth in the following claims.

I claim:

1. An improved, storage stable, emulsified salad dressing comprising a salad dressing emulsion and a chelating agent associated with said emulsion in an amount of at least about 0.001 percent by weight of the total volume of said emulsion, whereby metal ions, such as copper ions, are chelated from the phases of said emulsion to increase the storage stability of said dressing.

2. An improved, storage stable, emulsified salad dressing comprising a salad dressing emulsion and a compound associated with said emulsion and selected from the group consisting of ethylene diamine tetraacetic acid and sodium salts thereof in an amount of at least about 0.001 percent by weight of the total volume of said emulsion, whereby metal ions, such as copper ions, are chelated from the phases of said emulsion to increase the storage stability of said dressing.

3. An improved, storage stable, emulsified salad dressing comprising a two phase salad dressing emulsion having a water and an oil phase, and a compound associated with at least one of said phases and selected from the group consisting of ethylene diamine tetraacetic acid and sodium salts thereof in an amount of at least about 0.001 percent by weight of the total volume of said emulsified salad dressing, whereby metal ions, such as copper ions, are chelated from both phases of said emulsion to increase the storage stability of said dressing.

4. An improved, storage stable, emulsified salad dressing comprising an emulsified salad dressing and the disodium salt of ethylene diamine tetraacetic acid associated with the emulsion of said dressing in an amount of at least about 0.001 percent by weight of the total volume of said dressing, whereby metal ions, such as copper ions, are chelated from the phases of said emulsion to increase the storage stability of said dressing.

5. An improved, storage stable, emulsified salad dressing comprising an emulsified salad dressing having a water-oil emulsion and the disodium salt of ethylene diamine tetraacetic acid dissolved in said emulsion in an amount of at least about 0.001 percent by weight of the total volume of said emulsified salad dressing, whereby metal ions, such as copper ions, are chelated from both phases of said emulsion to increase the storage stability of said dressing.

6. An improved, storage stable, emulsified salad dressing comprising an emulsified salad dressing with ethylene diamine tetraacetic acid in an amount of more than about 0.003 percent by weight of the total volume of said dressing dissolved in at least one of the phases of said emulsion, whereby metal ions, such as copper ions, are chelated from the phases of said emulsion to increase the storage stability of said dressing.

7. An improved, storage stable, emulsified salad dressing comprising a water-oil emulsion of salad dressing ingredients including ethylene diamine tetraacetic acid in an amount of more than about 0.003 percent by weight of the total volume of said emulsified salad dressing dissolved in at least one phase of said dressing, whereby metal ions, such as copper ions, from all phases of said dressing are chelated to increase the storage stability of said dressing.

References Cited in the file of this patent

UNITED STATES PATENTS

| | | |
|---|---|---|
| 2,463,015 | Bersworth | Mar. 1, 1949 |
| 2,768,084 | Griffith et al. | Oct. 23, 1956 |

OTHER REFERENCES

"Versene," Bersworth Chemical Co., Framingham, Mass., Technical Bulletin No. 1, published Jan. 14, 1949, p. 2.